Patented Dec. 29, 1936

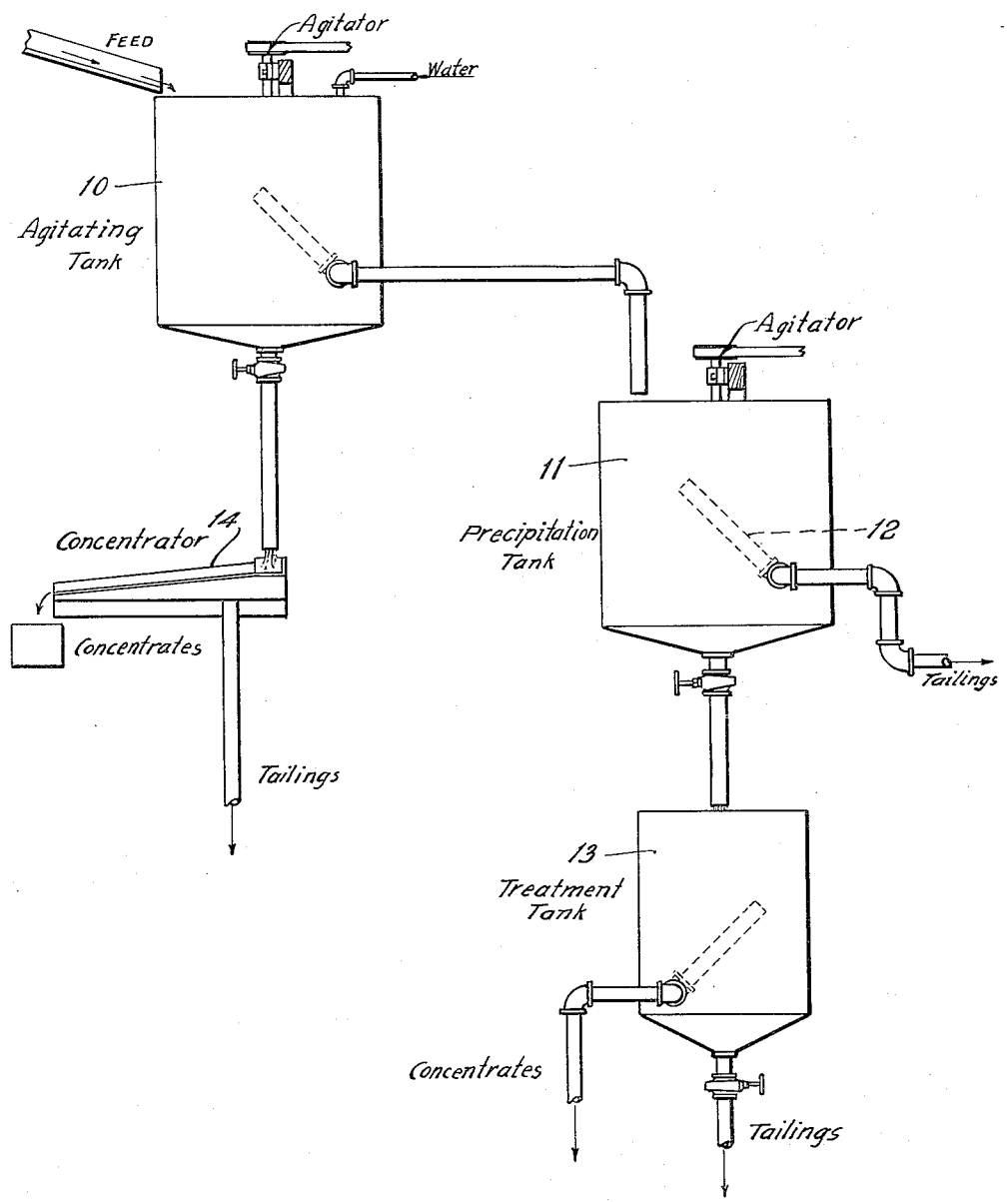

2,065,818

UNITED STATES PATENT OFFICE 2,065,818

PROCESS FOR RECOVERING FLOUR GOLD

George O. Marrs, Denver, Colo.

Application August 10, 1935, Serial No. 35,601

1 Claim. (Cl. 75—118)

This invention relates to a process for recovering exceedingly fine mineral values from sands or ground ore and while valuable for the recovery of fine values of any nature from any natural material, it is more particularly valuable for the recovery of the so called "flour gold," colloidal gold, and "soluble gold" from placer sands.

Placer sands are usually treated by means of sluice boxes or other riffled apparatus which catch and holds the larger and heavier values but allows the values which float or are easily kept in suspension to wash away with the water. It is impractical to chemically treat the entire sand supply in order to recover the fine values present since the coarse values can be effectively recovered by gravity or other methods, yet the treatment of all feed by gravity alone results in a loss of the "fines" or suspended values.

The principal object of this invention is to provide a process whereby the values of sufficient weight for gravity separation are recovered by a gravity separation process and values of sufficient fineness to remain suspended, or of a character to be dissolved or adsorbed, are automatically classified and separated from the "heavies" and subjected to a precipitation and chemical recovery process. This insures the recovery of all values regardless of their degree of fineness without subjecting either class to an unnecessary treatment.

Other objects and advantages reside in the process which will become more apparent from the following description.

In the following description of the invention, reference is had to the accompanying drawing which illustrates a typical flow diagram for carrying out the process. The process is applicable to any type of mineral bearing material, but is particularly valuable for use in placer sands.

Briefly the process consists of violently mixing the sand or ground rock with water; thence decanting or drawing off the water and subjecting it to a precipitation to recover any suspended values; thence subjecting the precipitate to treatment for dissolving out the gold. The sand after the decantation is passed to any suitable recovery device such as amalgam plates or a riffle device such as a sluice box, concentrating table or the like to recover the coarser gold particles.

It is not believed that these two processes have ever been used concurrently with each other. The first agitation and decantation acts as a classifying step to remove the values which can be placed in suspension from those which cannot, in advance of any treatment to recover these values.

In detail, the process comprises the following steps as applied to placer sand, reference being had to the accompanying drawing.

The sand is first placed in any suitable agitating tank, such as indicated at 10, to which is admitted a volume of water sufficient to allow thorough agitation or intermixing of the sands. The volume of water is variable, depending upon the particular sand, the usual amount being equal in weight to the amount of sand. The agitating tank should be provided with any suitable agitating device by means of which a violent agitation or intermixing of sand and water can be obtained to loosen all particles from each other. Immediately after agitation, the supernatant solution is decanted off with sufficient velocity to carry away all suspended solid material. This water of course, will be full of suspended particles, and in a muddy or slimy condition. The muddy water is run directly to a precipitation tank such as indicated at 11. In some cases, it is desirable to again subject the sands to a second volume of water and a second agitation to remove any remaining suspended materials therefrom. This second water can also be run to the precipitation tank 11.

To the decanted muddy liquid in the precipitation tank, ferrous sulfate is added, and the solution is agitated to obtain a perfect solution. Quick-lime (calcium oxide) is then added, and, if necessary sodium bicarbonate, and sal-ammoniac (ammonium chloride) is added and the mixture is agitated until the various chemicals have passed completely into solution.

The agitation is now stopped and the suspended material allowed to precipitate to the bottom of the precipitation tank in which a thick mud or slime will form. The precipitation period usually requires about ten minutes after which the clear supernatant liquid is slowly drawn off through a decantation pipe such as indicated at 12, so as not to disturb the slime or mud. The fluid can be run to a thickener for recovery of the water or discharged to waste.

The slime or mud in the bottom of the precipitation tank is a concentration of from 20 to 300 on the original sand. This mud is discharged into a treatment tank 13 where it may be subjected to cyanide, chlorination, smelting, or any other standard treatment for recovering the mineral values therefrom. The residual mud is discharged to the waste.

The heavy sands remaining in the agitating tank 10 after decantation are discharged therefrom to a gravity table 14, or to a sluice box or other device where the heavy values are recovered.

The action of the chemicals is as follows: The ferrous sulfate permeates the sand and precipitates any gold and silver occurring in soluble form, such as gold or silver chlorides; the quick-lime has a double action—it clears the liquid of colloidal and suspended matter by a mechanical-chemical change in the solution, but more particularly it precipitates the iron from the ferrous sulfate as ferrous hydroxide. The ferrous hydroxide, being nascent, rapidly completes the precipitation of any soluble metals and instantly seizes the oxygen dissolved in the water, completely and instantly deoxidizing it. It also forms a precipitant body of mixed ferrous and ferric hydroxides which collects and holds the colloids and fine precipitation and quickly settles them out of the solution. The sodium bicarbonate interacts with the quick-lime to produce calcium carbonate, an insoluble precipitate, which also helps flocculate and clear the solution of colloids and suspended matter. The ammonium chloride interacts with the quick-lime to produce ammonia water, which materially aids in the mechanical precipitation, with some sands. With certain sands the ammonia is of little advantage and can be dispensed with.

The amount of chemicals and the desirability of the various chemicals are ascertained by careful tests upon the particular sand being treated. Typical quantities are one-half pound to three pounds of ferrous sulfate; one to four pounds of sodium bicarbonate; one-half to two pounds of ammonium chloride. A sufficient quantity of quicklime to complete the above indicated reactions with the ferrous sulfate, sodium bicarbonate and ammonium chloride and leave not less than two and one-half pounds of quicklime per ton in the solution after the reactions are complete.

If the gold is to be recovered from the mud or slime by cyanide treatment, it will be found that the lime used for precipitation has eliminated acids and practically all deterrents to cyanide treatment and has left the slime in ideal condition without further preliminary treatment thus making cyanide the ideal method of recovery of the gold from these muds or slimes.

This process is also adapted to the recovery of silver, copper, lead and other precious metal slimes from concentration tables, jiggs and the like.

It is believed that the most important step in this process is the classifying and drawing off of the fines in solution before the coarser particles are treated for recovery. The precipitation with quick lime, however, is also valuable and important.

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except in so far as such limitations are included within the terms of the accompanying claim in which it is the intention to claim all novelty inherent in the invention as broadly as is permissible in view of the prior art.

Having thus described the invention, what is claimed and desired secured by Letters Patent is:—

A process of extracting free gold from sands of varying mesh comprising: feeding all of said sands into an agitating tank with water; agitating said water to place the fine sands and slimes into suspension; continuously drawing off the solution with its suspended fines; discharging the settled sands from said tank; thence simultaneously treating the fines to a chemical separation while treating the sands to a gravity treatment.

GEORGE O. MARRS.